US008434006B2

(12) United States Patent
Profitt

(10) Patent No.: US 8,434,006 B2
(45) Date of Patent: Apr. 30, 2013

(54) SYSTEMS AND METHODS FOR ADJUSTING VOLUME OF COMBINED AUDIO CHANNELS

(75) Inventor: Jeremy Profitt, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 653 days.

(21) Appl. No.: 12/533,750

(22) Filed: Jul. 31, 2009

(65) Prior Publication Data

US 2011/0029874 A1 Feb. 3, 2011

(51) Int. Cl.
*G06F 3/00* (2006.01)

(52) U.S. Cl.
USPC .......... 715/722

(58) Field of Classification Search .......... 715/722
See application file for complete search history.

(56) References Cited

U.S. PATENT DOCUMENTS

| | | | | |
|---|---|---|---|---|
| 5,418,559 | A | 5/1995 | Blahut | |
| 5,532,753 | A * | 7/1996 | Buchner et al. | 725/56 |
| 6,009,363 | A * | 12/1999 | Beckert et al. | 701/1 |
| 6,230,322 | B1 * | 5/2001 | Saib et al. | 725/40 |
| 6,240,070 | B1 * | 5/2001 | Kozdon et al. | 370/260 |
| 6,311,161 | B1 | 10/2001 | Anderson et al. | |
| 6,452,612 | B1 * | 9/2002 | Holtz et al. | 715/723 |
| 6,590,618 | B1 * | 7/2003 | Park et al. | 348/734 |
| 6,784,945 | B2 * | 8/2004 | Norsworthy et al. | 348/731 |
| 7,024,677 | B1 * | 4/2006 | Snyder et al. | 725/86 |
| 7,266,501 | B2 | 9/2007 | Saunders et al. | |
| 7,302,644 | B2 * | 11/2007 | Holtz et al. | 715/720 |
| 7,362,349 | B2 * | 4/2008 | Nelson et al. | 348/14.08 |
| 7,415,120 | B1 * | 8/2008 | Vaudrey et al. | 381/109 |
| 7,432,981 | B1 | 10/2008 | Herz | |
| 7,580,080 | B2 * | 8/2009 | Anderson | 348/565 |
| 7,869,892 | B2 * | 1/2011 | Foust et al. | 700/94 |
| 8,014,543 | B2 * | 9/2011 | Hirano | 381/119 |
| 2002/0056094 | A1 | 5/2002 | Dureau | |
| 2002/0175931 | A1 * | 11/2002 | Holtz et al. | 345/716 |
| 2003/0002481 | A1 | 1/2003 | Laursen et al. | |
| 2003/0142814 | A1 * | 7/2003 | Roy et al. | 379/388.04 |
| 2004/0097853 | A1 | 5/2004 | Aidiniantz | |
| 2005/0058307 | A1 * | 3/2005 | Yang et al. | 381/119 |
| 2005/0226430 | A1 * | 10/2005 | Kreifeldt et al. | 381/58 |
| 2005/0226595 | A1 * | 10/2005 | Kreifeldt et al. | 386/46 |
| 2005/0239396 | A1 * | 10/2005 | Kreifeldt et al. | 455/3.01 |
| 2005/0239397 | A1 * | 10/2005 | Kreifeldt et al. | 455/3.01 |
| 2005/0281417 | A1 | 12/2005 | Toprover | |
| 2006/0080704 | A1 | 4/2006 | Le Huerou et al. | |
| 2006/0215857 | A1 * | 9/2006 | Hirano | 381/119 |
| 2006/0282562 | A1 * | 12/2006 | Aiso et al. | 710/33 |
| 2007/0039034 | A1 * | 2/2007 | Sokol et al. | 725/117 |
| 2007/0041338 | A1 | 2/2007 | Rowe | |
| 2007/0044137 | A1 | 2/2007 | Bennett | |

(Continued)

*Primary Examiner* — Tuyetlien Tran
*Assistant Examiner* — Jessica Chuang
(74) *Attorney, Agent, or Firm* — Lowe Graham Jones PLLC

(57) ABSTRACT

Audio volume control systems and methods are operable to control volume of audio channels of a combined audio channel. An exemplary embodiment displays an audio channel control graphical user interface (GUI) on a display, displays on the audio channel control GUI a specified first volume level for a first audio channel of the combined audio channel, displays on the audio channel control GUI a specified second volume level for a second audio channel of the combined audio channel, and adjusts volume of the combined audio channel in accordance with the specified first volume level for the first audio channel and the specified second volume level for the second audio channel.

14 Claims, 4 Drawing Sheets

U.S. PATENT DOCUMENTS

2007/0118852 A1 5/2007 Calderwood
2007/0139556 A1* 6/2007 Liebhold ........................ 348/565
2007/0160218 A1* 7/2007 Jakka et al. ..................... 381/22
2007/0177743 A1* 8/2007 Mertens ........................ 381/107
2008/0034029 A1* 2/2008 Fang et al. .................... 709/203
2008/0074550 A1* 3/2008 Park ............................. 348/565
2008/0086687 A1* 4/2008 Sakai et al. ................... 715/716
2008/0253592 A1* 10/2008 Sanders et al. ................ 381/306
2009/0055005 A1 2/2009 Oxman et al.
2009/0129601 A1* 5/2009 Ojala et al. ......................... 381/1
2009/0303387 A1* 12/2009 Chen et al. .................... 348/565
2010/0042925 A1* 2/2010 Demartin et al. ............. 715/716
2010/0054694 A1* 3/2010 Liu et al. .......................... 386/54
2010/0142730 A1* 6/2010 Lindahl et al. ................ 381/119
2011/0023077 A1* 1/2011 Simon ........................... 725/134

* cited by examiner

SYSTEMS AND METHODS FOR ADJUSTING VOLUME OF COMBINED AUDIO CHANNELS

BACKGROUND

Media devices may provide programming that is presented on a media presentation device. An example of a media device is a set top box (STB) that receives programming from a media provider, which is communicated to a television that is connected to the STB. Other media devices include their own integrated display or the like upon which the programming may be presented. The programming may be provided to the media device over a variety of media, such as a cable system, a satellite system, or the Internet.

A viewer operates their media device so that a program of interest is presented to them on the media presentation device. For example, a viewer may operate their STB to tune to a particular program channel that is presenting the program of interest. Accordingly, the STB provides a streaming video channel and a corresponding streaming audio channel such that the viewer is able to view the video and listen to the audio of the selected program of interest.

Advancing technologies have enabled media presentation devices to display multiple video channels on a single display. For example, a picture in picture (PIP) format allows a primary video channel to be displayed over the main field area of the display, while a reduced size, and relatively small image generated by a second video channel (the PIP video channel) is displayed superimposed over the top of the main field area at a selected location. Another exemplary format is a picture and picture (PAP) format that displays two video channels adjacent to each other on the display. Yet another exemplary format is picture over picture (POP) where the viewer may easily toggle between programs presented on the display.

However, the media presentation device typically has only a single audio system that is capable of reproducing the sounds of a single audio channel. That is, the viewer is able to listen to only one audio channel at a time, even if multiple video channels are being viewed. Further, the average viewer is not able to listen to both audio channels simultaneously. In most situations, the viewer will only want to listen to one audio channel at a time because of the viewer's difficulties of mentally processing two different audio channels. That is, it is difficult for a viewer to meaningfully discern and understand two different audio channels at the same time. Accordingly, the viewer must select a single audio channel associated with a particular video channel of interest.

For example, the viewer may be using the PIP feature of their media presentation device to watch a first program of interest presented as the primary video channel and a second program of interest as the PIP video channel. The viewer may listen to only one of the audio channels at a time. Such systems are configured to allow the viewer to easily select, or toggle between, the two audio channels.

However, in some situations the viewer may wish to simultaneously listen to two different audio channels. For example, the viewer may be concurrently viewing a golfing event and a music video. Here, the viewer could listen to both the music of the music video and listen to the commentator's narrative of the golfing event. Furthermore, some media presentation devices are configured to receive audio-only channels, such as music provided by a radio station or the like. For example, the viewer may be viewing a news cast or a political speech, and may wish to have music from an audio-only source concurrently played while they view and listen to the news cast or political speech. Accordingly, there is a need in the arts to enable the viewer to control volume of multiple audio channels.

SUMMARY

Systems and methods of controlling volume of audio channels of a combined audio channel are disclosed. An exemplary embodiment displays an audio channel control graphical user interface (GUI) on a display, displays on the audio channel control GUI a specified first volume level for a first audio channel of the combined audio channel, displays on the audio channel control GUI a specified second volume level for a second audio channel of the combined audio channel, and adjusts volume of the combined audio channel in accordance with the specified first volume level for the first audio channel and the specified second volume level for the second audio channel.

In accordance with further aspects, an exemplary embodiment has a display operable to display an audio channel control graphical user interface (GUI) displayed on a display, wherein the audio channel control GUI displays a specified first volume level for a first audio channel of the combined audio channel and displays a specified second volume level for a second audio channel of the combined audio channel, has a processor system operable to receive the specified first volume level for the first audio channel and the specified second volume level for the second audio channel, and has an interface to a sound system, wherein the interface is operable to communicate the combined audio channel to the sound system.

BRIEF DESCRIPTION OF THE DRAWINGS

Preferred and alternative embodiments are described in detail below with reference to the following drawings.

DETAILED DESCRIPTION

Figure 1:
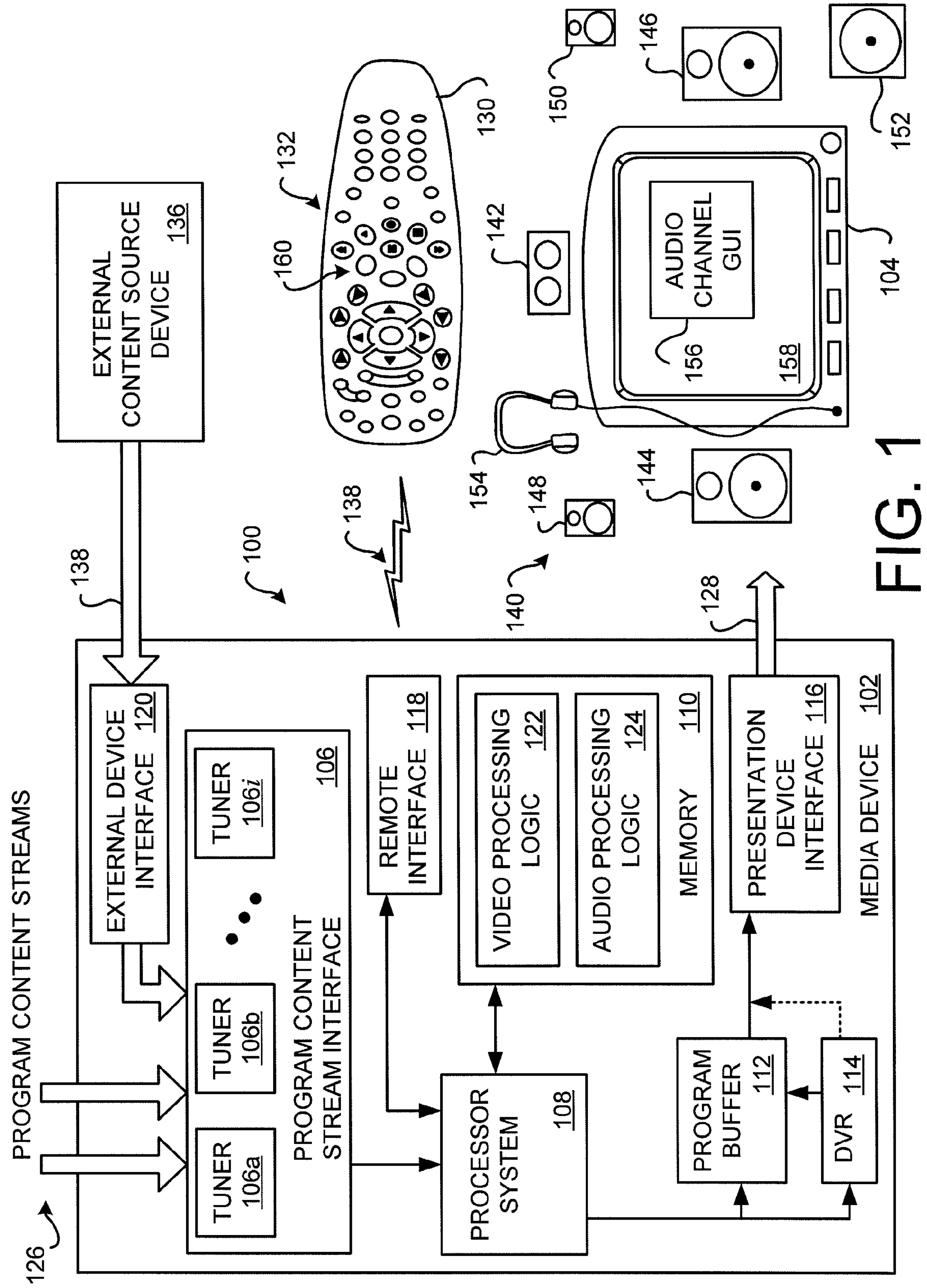
FIG. 1 is a block diagram of an embodiment of a media device audio control system.

FIG. 1 is a block diagram of an embodiment of the media device audio control system 100. An exemplary embodiment of the media device audio control system 100 resides in a media device 102. In an exemplary embodiment, the media device audio control system 100 facilitates independent control of multiple audio channels so that one or more users may simultaneously listen to a combined audio channel from their media presentation device 104.

Nonlimiting examples of the media device 102 include, but are not limited to, a set top box (STB). Embodiments of the media device audio control system 100 may be implemented in other media devices, such as, but not limited to, televisions (TVs), digital video disc (DVD) players, digital video recorders (DVRs), cellular phones equipped with video functionality, personal device assistants (PDAs), or personal computers (PCs).

The nonlimiting exemplary media device 102 comprises a program content stream interface 106, a processor system 108, a memory 110, a program buffer 112, an optional digital video recorder (DVR) 114, a presentation device interface 116, a remote interface 118, and an optional external device interface 120. The memory 110 comprises portions for storing the video processing logic 122 and the audio processing logic 124. Other media devices may include some, or may omit some, of the above-described media processing components. In some embodiments, the video processing logic 122 and the audio processing logic 124 may be integrated together, and/or may be integrated with other logic. Further, additional components not described herein may be included in alternative embodiments.

The functionality of the media device 102, here a STB, is now broadly described. One or more program content streams 126 are received by the program content stream interface 106. One or more tuners 106*a*-106*i* in the program content stream interface 106 selectively tune to one of the program content streams 126 in accordance with instructions received from the processor system 108. A program content stream 126 typically comprises a plurality of programs multiplexed together. The processor system 108, based upon a request for a program of interest specified by the user, parses out program content associated with the program of interest. The program of interest is then assembled into a stream of video information and audio information which may be saved into the program buffer 112 such that the program video and audio content 128 can be streamed out to the media presentation device 104, such as the illustrated television, via the presentation device interface 116. Alternatively, or additionally, the parsed out program content may be saved into the DVR 114 for later presentation.

The media device audio control system 100 embodiment implemented in the exemplary media device 102 is configured to receive commands from the user via an optional remote control 130. The remote control 130 includes one or more controllers 132. The user, by actuating one or more of the controllers 132, causes the remote control 130 to generate and transmit commands, via a wireless signal 134, to the media device 102 to control generation of the output video and audio content stream 128.

The optional external device interface 120 is configured to communicatively couple to an external content source device 136. The external content source device 136 provides video and/or audio content to the media device 102. Nonlimiting examples of the external content source device 136 include digital video devices (DVDs), compact disk (CD) players, radios, stereos, video cassette recorders (VCRs) and other media source devices. In some embodiments, the external content source device 136 may be an interface that communicatively couples the media device 102 to the Internet or other communication system. The external content source device 136 provides an audio content stream 138 to the media device 102. The audio content stream may optionally include a video stream.

To facilitate a conceptual explanation of the media device audio control system 100, a plurality of speakers operated by a suitable 5.1 surround system 140 are illustrated. The surround system 140 includes a center channel speaker 142, a front left channel speaker 144, a front right channel speaker 146, a rear left channel speaker 148, a rear right channel speaker 150, and a sub-woofer channel speaker 152. Embodiments of the media device audio control system 100 can be configured to control any number of speakers that reproduce sounds based upon the audio information provided in the video and audio content stream 128. Further, in some embodiments, a headphone set 154 may be coupled to the media presentation device 104 (or to the media device 102).

To facilitate volume control of multiple audio channels, an audio channel control graphical user interface (GUI) 156 may be presented on the display 158 of the media presentation device 104. The viewer is able to navigate about the audio channel control GUI 156 so as to control volume of individual audio channels of the output video and audio content stream 128. In some embodiments, the viewer is able to navigate about the audio channel control GUI 156 using their remote control 130. Some remote controls 130 may include a special function button 160 thereon that initiates presentation of the audio channel control GUI 156 on the display 158. Alternatively, or additionally, a plurality of physical controllers may be provided on the media device 102 and/or the media presentation device 104 that allows the user to control the volume of the multiple audio channels. The audio channel control GUI 156 could graphically indicate the selected volume levels selected by the user.

Figure 2:
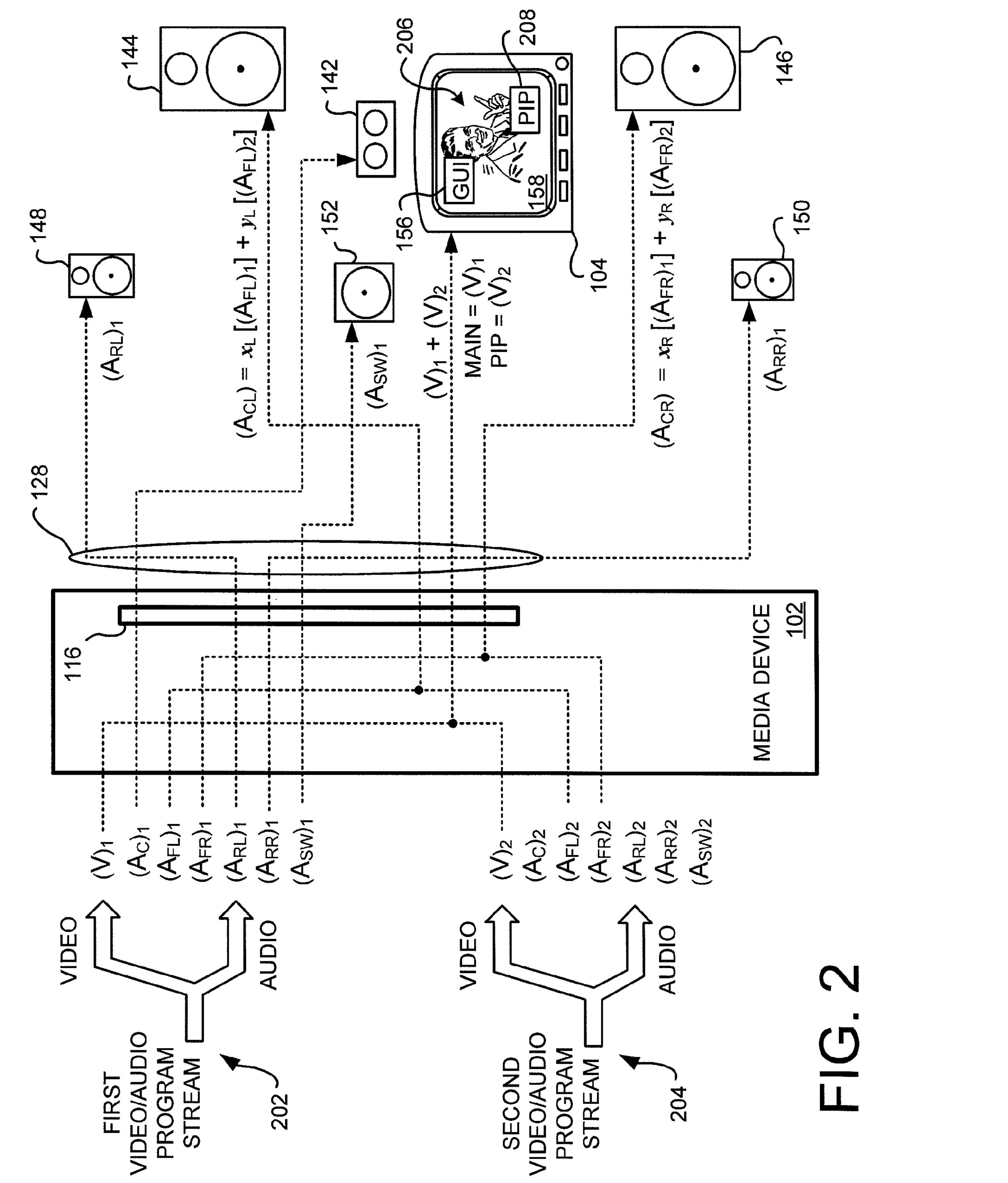
FIG. 2 conceptually illustrates operation of the media device audio control system when two video/audio program streams are processed to present a combined audio channel.

FIG. 2 conceptually illustrates operation of the media device audio control system 100 when two video/audio program streams are processed to present a combined audio channel. That is, two or more audio channels are integrated into a combined audio channel.

For this simplified example, it is assumed that the first video/audio program stream 202 comprises a video channel $[(V)_1]$, and an audio channel formatted for a 5.1 surround sound system. Thus, it is appreciated that the first video/audio program stream 202 may be a movie or the like received in a program content stream 126 or received from the external content source device 136. The audio portion of the first video/audio program stream 202 includes an audio center channel $[(A_C)_1]$, an audio front left channel $[(A_{FL})_1]$, an audio front right channel $[(A_{FR})_1]$, an audio rear left channel $[(A_{RL})_1]$, an audio rear right channel $[(A_{RR})_1]$, and an audio sub-woofer channel $[(A_{SW})_1]$.

Further, it is assumed that the second video/audio program stream 204 comprises a channel or video information $[(V)_2]$, and another audio channel for 5.1 surround sound. Thus, it is appreciated that the second video/audio program stream 204 may be a movie or the like received in a program content stream 126 or received from the external content source device 136. The audio portion of the second video/audio program stream 204 includes an audio center channel $[(A_C)_2]$, an audio front left channel $[(A_{FL})_2]$, an audio front right channel $[(A_{FR})_2]$, an audio rear left channel $[(A_{RL})_2]$, an audio rear right channel $[(A_{RR})_2]$, and an audio sub-woofer channel $[(A_{SW})_2]$.

Here, the example assumes that the first video/audio program stream 202 is the primary program of interest. Accordingly, the video channel $[(V)_1]$ is processed and communicated from the media device 102 to the media presentation device 104 in the output video and audio content stream 128. The first video channel $[(V)_1]$ is received by the media presentation device 104 such that the video of the first video/audio program stream 202 is presented on a main field area 206 of the display 158, as conceptually illustrated by a man shown on the display 158.

Further, the example assumes that the second video channel $[(V)_2]$ of the second video/audio program stream 204 is presented in a small picture in picture (PIP) area 208. Accordingly, the video processing logic 122 (FIG. 1) combines the first video channel $[(V)_1]$ and the second video channel $[(V)_2]$ into a combined video channel $[(V)_1+(V)_2]$, as conceptually illustrated by the corresponding dashed lines shown in FIG. 2. Alternatively, the first video channel $[(V)_1]$ and the second video channel $[(V)_2]$ may be separately transmitted if the media presentation device 104 is configured to separately process the two received video channels $[(V)_1]$ and $[(V)_2]$ (one as the primary channel and one as the PIP channel).

Since the first video channel $[(V)_1]$ is assumed to be the primary program of interest, the audio center channel $[(A_C)_1]$ is communicated to the center channel speaker 142, the audio rear left channel $[(A_{RL})_1]$ is communicated to the rear left channel speaker 148, the audio rear right channel $[(A_{RR})_1]$ is communicated to the rear right channel speaker 150, and the audio sub-woofer channel $[(A_{SW})_1]$ is communicated to the sub-woofer channel speaker 152. Thus, the user is listening to these audio channels of the 5.1 surround sound audio channel of the primary program.

However, to facilitate listening to both of the first and second audio channels, embodiments of the media device audio control system 100 combines the first audio front left channel $[(A_{FL})_1]$ and the second audio front left channel $[(A_{FL})_2]$ into a combined audio left channel $[(A_{CL})]$ that is communicated to the front left channel speaker 144. Similarly, the first audio front right channel $[(A_{FR})_1]$ and the second audio front right channel $[(A_{FR})_2]$ are combined into a combined audio right channel $[(A_{CR})]$ that is communicated to the front right channel speaker 146.

Embodiments of the media device audio control system 100 allow independent volume adjustment of individual audio channels. The volume may be independently adjusted or adjusted relative to each other, depending upon the embodiment and/or preferences of the user. The volume adjustments are, in an exemplary embodiment, made by the user who navigates about the audio channel control GUI 156.

In an exemplary embodiment, the volume $(A_{CL})$ of the combined first audio front left channel $[(A_{FL})_1]$ and second audio front left channel $[(A_{FL})_2]$ may be described in accordance with Equation 1.

$$\text{Volume}(A_{CL})=X_L[(A_{FL})_1]+Y_L[(A_{FL})_2], \qquad \text{Eq. 1}$$

where $X_L$ is a first volume factor corresponding to the volume of the first audio front left channel $[(A_{FL})_1]$, and where $Y_L$ is a second volume factor corresponding to the volume of the second audio front left channel $[(A_{FL})_2]$.

Similarly, the volume $(A_{CR})$ of the combined first audio front right channel $[(A_{FR})_1]$ and second audio front right channel $[(A_{FR})_2]$ may be described in accordance with Equation 2.

$$\text{Volume}(A_{CR})=X_R[(A_{FR})_1]+Y_R[(A_{FR})_2], \qquad \text{Eq. 2}$$

where $X_R$ is a third volume factor corresponding to the volume of the first audio front right channel $[(A_{FR})_1]$, and where $Y_R$ is a fourth volume factor corresponding to the volume of the second audio front right channel $[(A_{FR})_2]$.

The volume factors $X_L$ and $Y_L$ may be specified as relative values with respect to each other. For example, the first volume factor $X_L$ may be specified as being eighty percent (80)% of the total volume level and the second volume factor $Y_L$ may be specified as being twenty percent (20)% of the total volume level. Thus, at any particular volume level setting, the front left channel speaker 144 produces a combined audio channel $[(A_{CL})]$ of the first audio front left channel $[(A_{FL})_1]$ and the second audio front left channel $[(A_{FL})_2]$, where the first audio front left channel $[(A_{FL})_1]$ is set to 80% of the total specified volume level and wherein the second audio front left channel $[(A_{FL})_2]$ is set to 20% of the total specified volume level.

Alternatively, or additionally, the volume factors $X_L$ and $Y_L$ may be specified independently of each other. For example, the first volume factor $X_L$ may be specified as being at a volume level 4 (of, for instance, 10 volume level increments) and the second volume factor $Y_L$ may be specified as being at a volume level 1 (of the 10 volume level increments). Accordingly, at the specified volume settings, the front left channel speaker 144 produces a combined audio channel at a volume level 5, which corresponds to a volume level that is 50% of the maximum volume level. Here, the first audio front left channel $[(A_{FL})_1]$ is at 80% of the total volume level 5 and the second audio front left channel $[(A_{FL})_2]$ is at 20% of the total volume level 5.

Similarly, the volume factors $X_R$ and $Y_R$ may be specified with respect to each other or specified independently of each other. Further, the volume factors $X_L$ and $X_R$, and the volume factors $X_L$ and $Y_L$, respectively, may be different from each other. The volume factors may be specified in any suitable manner in the various embodiments.

In this simplified example, the audio center channel $[(A_C)_2]$, the audio rear left channel $[(A_{RL})_2]$, the audio rear right channel $[(A_{RR})_2]$, and the audio sub-woofer channel $[(A_{SW})_2]$ of the second video/audio program stream 204 were not combined with the respective audio channels of the first video/audio program stream 202. However, one or more of these audio channels of the second video/audio program stream 204 may be optionally combined with their respective audio channels of the first video/audio program stream 202 depending upon the embodiment and/or the preferences of the user.

The second video/audio program stream 204 was described as having an audio stream based upon a 5.1 surround sound format. The second video/audio program stream 204 could have been available in another format. For example, the second video/audio program stream 204 may have been an audio-only music program from a radio or CD where the music is in a two channel format (an audio front left channel $[(A_{FL})_2]$ and an audio front right channel $[(A_{FR})_2]$). Accordingly, the second video/audio program stream 204 would not have the video channel $[(V)_2]$, the audio center channel $[(A_C)_2]$, the audio rear left channel $[(A_{RL})_2]$, the audio rear right channel $[(A_{RR})_2]$, and the audio sub-woofer channel $[(A_{SW})_2]$.

Figure 3:
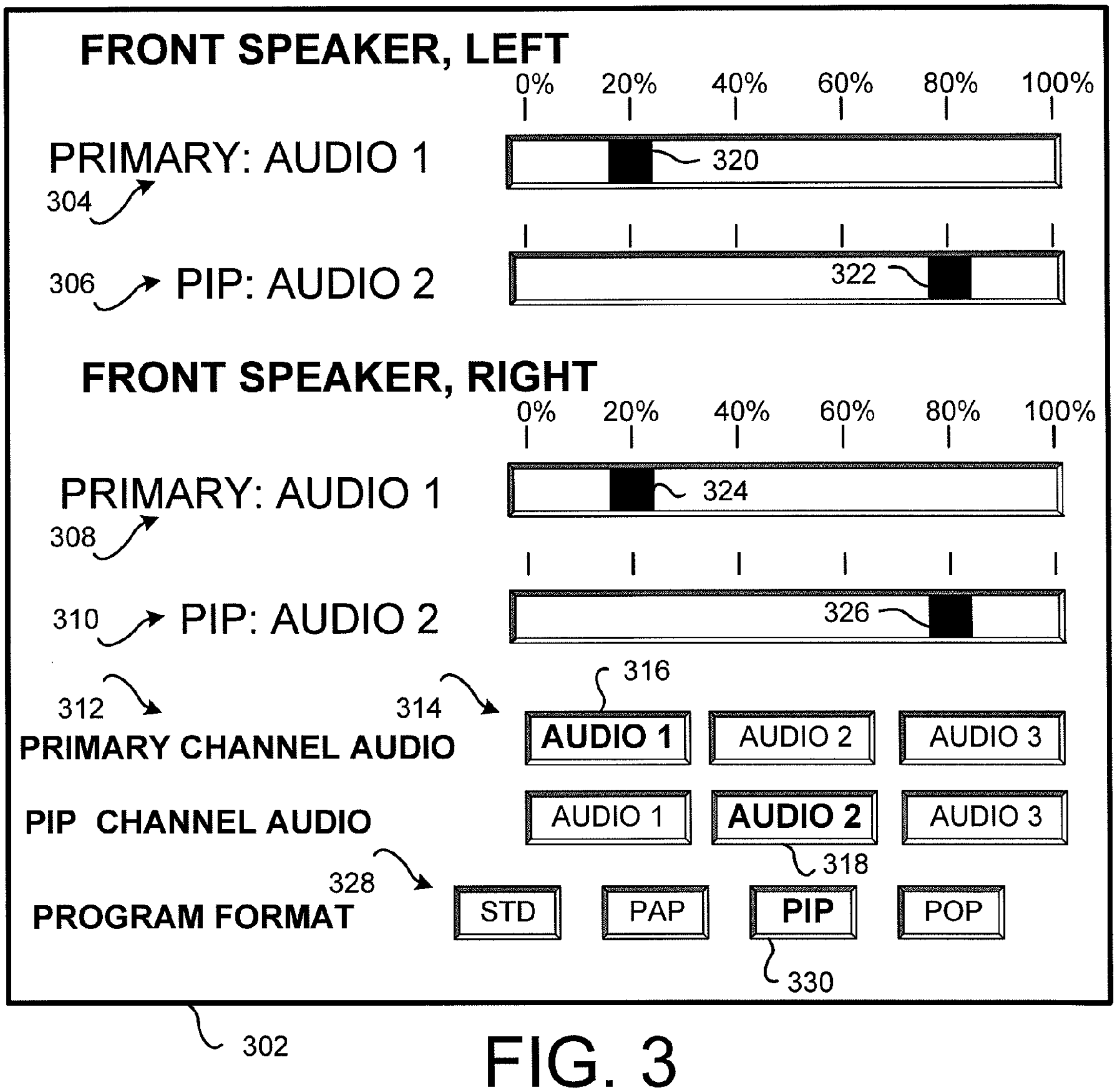
FIG. 3 illustrates an exemplary audio channel control GUI.

FIG. 3 illustrates an exemplary audio channel control GUI 302 (corresponding to the audio channel control GUI 156 of FIGS. 1 and 2) where volume of audio channels may be independently controlled. The audio channel control GUI employs a virtual volume level controller so that the user may independently control volume of the audio channels that are combined together into the combined audio channel that is output from a speaker.

As illustrated in FIG. 3, the virtual volume level controller is a first virtual fader bar 304 provides a GUI interface where the user may slidably adjust volume of the left front audio channel of a selected first audio channel ("Audio 1") that is produced at the left front channel speaker 144 (FIGS. 1 and 2). A second virtual fader bar 306 provides a GUI interface where the user may slidably adjust volume of the left front audio channel of a selected second audio channel ("Audio 2") that is also produced at the left front channel speaker 144. Here, embodiments of the media device audio control system 100 have combined the left front audio channels of the selected first and second audio channels into a combined left front audio channel $[(A_{CL})]$.

Similarly, a third virtual fader bar 308 provides a GUI interface where the user may slidably adjust volume of the right front audio channel of the selected first audio channel ("Audio 1") that is produced at the right front channel speaker 146 (FIGS. 1 and 2). A fourth virtual fader bar 310 provides a GUI interface where the user may slidably adjust volume of the right front audio channel of the selected second audio channel ("Audio 2") that is also produced at the right front channel speaker 146. Here, embodiments of the media device audio control system 100 have combined the right front audio channels of the selected first and second audio channels into a combined right front audio channel [($A_{CR}$)].

Below the fourth virtual fader bar 310, in this exemplary audio channel control GUI 302, is a region 312 indicating that the user may specify which received audio streams will be the selected as the Audio 1 and the Audio 2 channels. A plurality of virtual audio channel selection buttons 314 are provided indicating that the media device 102 is configured to receive (or is receiving) three different audio streams (Audio 1, Audio 2, and Audio 3). The "Primary Channel Audio" corresponds to the video and audio stream that will be used as the primary video channel presented on the media presentation device 104. The "PIP Channel Audio" corresponds to the video and audio stream that will be used as the PIP video channel presented on the media presentation device 104.

In this simplified example, the user has navigated to and selected "Audio 1" as the primary channel audio, as indicated by the highlighted virtual audio channel selection button 316. Thus user has also navigated to and selected "Audio 2" as the PIP channel audio, as indicated to the highlighted virtual audio channel selection button 318. In other embodiments, the selection of audio channels may be controlled by selection of a video channel, such as used to select the primary program of interest and the PIP program.

With respect to the exemplary embodiment of FIG. 2, it is appreciated that the selected "Audio 1" (associated with the primary channel audio) corresponds to the first video/audio program stream 202. Accordingly, the first video channel [$(V)_1$] would be presented on the main field area 206 on the display 158. Similarly, the selected "Audio 2" (associated with the PIP channel audio) corresponds to the second video/audio program stream 204. Accordingly, the second video channel [$(V)_2$] would be presented on the PIP area 208 on the display 158. In some embodiments, audio channels may be selected using physical buttons or the like on the media device 102.

Embodiments have been described in the context of the audio two programs being presented, one of which is presented using a PIP feature. Another exemplary format is a picture and picture (PAP) format that displays two video channels adjacent to each other on the display. Yet another exemplary format is picture over picture (POP) where the viewer may easily toggle between programs presented on the display. FIG. 3 illustrates a plurality of virtual presentation format selection buttons 328. Presentation formats include a standard format (one channel only), the PIP format, the PAP format and the POP format. Here, the virtual presentation format selection buttons 330 has been highlighted to indicate selection of the PIP format.

In this example, the first audio front left channel [$(A_{FL})_1$] of the selected first audio channel ("Audio 1") and the second audio front left channel [$(A_{FL})_2$] of the selected second audio channel ("Audio 2") are combined into a combined audio left channel [($A_{CL}$)] produced on the left front channel speaker 144. A virtual button 320, which is slidably adjustable by the user, is illustrated as being set at 20% such that the first audio front left channel [$(A_{FL})_1$] is set at 20% of the total volume level. A virtual button 322, which is slidably adjustable by the user, is illustrated as being set at 80% such that the second audio front left channel [$(A_{FL})_2$] is set at 80% of the total volume level. Accordingly, the combined audio left channel [($A_{CL}$)] may be described in accordance with Equation 3.

$$\text{Volume}(A_{CL})=0.20[(A_{FL})_1]+0.80[(A_{FL})_2], \quad \text{Eq. 3}$$

where $X_L$ is 20%, and where $Y_L$ is 80%.

Similarly, the first audio front right channel [$(A_{FR})_1$] of the selected first audio channel ("Audio 1") and the second audio front right channel [$(A_{FR})_2$] of the selected second audio channel ("Audio 2") are combined into a combined audio right channel [($A_{CR}$)] produced on the right front channel speaker 146. A virtual button 324, which is slidably adjustable by the user, is illustrated as being set at 20% such that the first audio front right channel [$(A_{FR})_1$] is set at 20% of the total volume level. A virtual button 326, which is slidably adjustable by the user, is illustrated as being set at 80% such that the second audio front right channel [$(A_{FR})_2$] is set at 80% of the total volume level. Accordingly, the combined audio right channel [($A_{CR}$)] may be described in accordance with Equation 4.

$$\text{Volume}(A_{CR})=0.20[(A_{FR})_1]+0.80[(A_{FR})_2], \quad \text{Eq. 4}$$

where $X_R$ is 20%, and where $Y_R$ is 80%.

Figure 4:
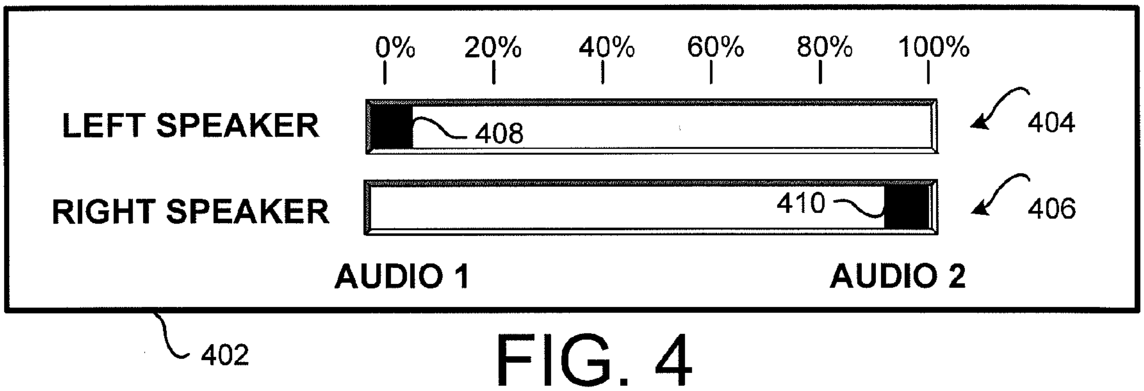
FIG. 4 illustrates an alternative audio channel control GUI.

FIG. 4 illustrates an alternative audio channel control GUI 402 where volume of audio channels that are combined together may be controlled in a related manner. Here, it is assumed that the user has navigated to and selected "Audio 1" as the primary channel audio and has navigated to and selected "Audio 2" as the PIP channel audio.

A first virtual fader bar 404 provides a GUI interface where the user may slidably adjust relative volume of the left front audio channel of the selected first and second audio channels ("Audio 1" and "Audio 2") that is produced at the left front channel speaker 144. A second virtual fader bar 406 provides a GUI interface where the user may slidably adjust relative volume of the right front audio channel of the selected first and second audio channels ("Audio 1" and "Audio 2") that is produced at the right front channel speaker 146.

In this illustrative example, the virtual button 408, which is slidably adjustable by the user, is illustrated as being set at 0% such that the first audio front left channel [$(A_{FL})_1$] is set at 0% of the total volume level. That is, the first audio front left channel [$(A_{FL})_1$] is not produced on the left front channel speaker 144. Because the virtual button 408 also controls the second audio front left channel [$(A_{FL})_2$], which is set by default at 100% of the total volume level, all of the sound produced from the left front channel speaker 144 is from the second audio front left channel [$(A_{FL})_2$]. Accordingly, the combined audio left channel [($A_{CL}$)] is described in accordance with Equation 5.

$$\text{Volume}(A_{CL})=0[(A_{FL})_1]+1.0[(A_{FL})_2], \quad \text{Eq. 5}$$

where $X_L$ is 0%, and where $Y_L$ is 100%.

Similarly, the virtual button 410, which is slidably adjustable by the user, is illustrated as being set at 100%. Thus, the first audio front right channel [$(A_{FR})_1$] is set at 100% of the total volume level. The second audio front right channel [$(A_{FR})_2$] is set at 0% of the total volume level. That is, the first audio front left channel [$(A_{FL})_1$] is providing all of the sound produced from the right front channel speaker 146. Accordingly, the combined audio right channel [($A_{CR}$)] is described in accordance with Equation 6.

$$\text{Volume}(A_{CR})=1.0[(A_{FR})_1]+0[(A_{FR})_2], \quad \text{Eq. 6}$$

where $X_L$ is 100%, and where $Y_L$ is 0%.

The situation above could be useful if there are two viewers interested in separately listening to the audio from two different programs. For example, the right front channel speaker 146 could be directed to the viewer who is interested in listening to the audio of the first video/audio program stream 202. The left front channel speaker 144 could be directed to the other viewer interested in listening to the audio of the second video/audio program stream 204. Alternatively, if the headphones 154 (FIG. 1) are available, the audio channel of one of the video/audio program streams 202 or 204 could be directed to the headphones 154.

Figure 5:
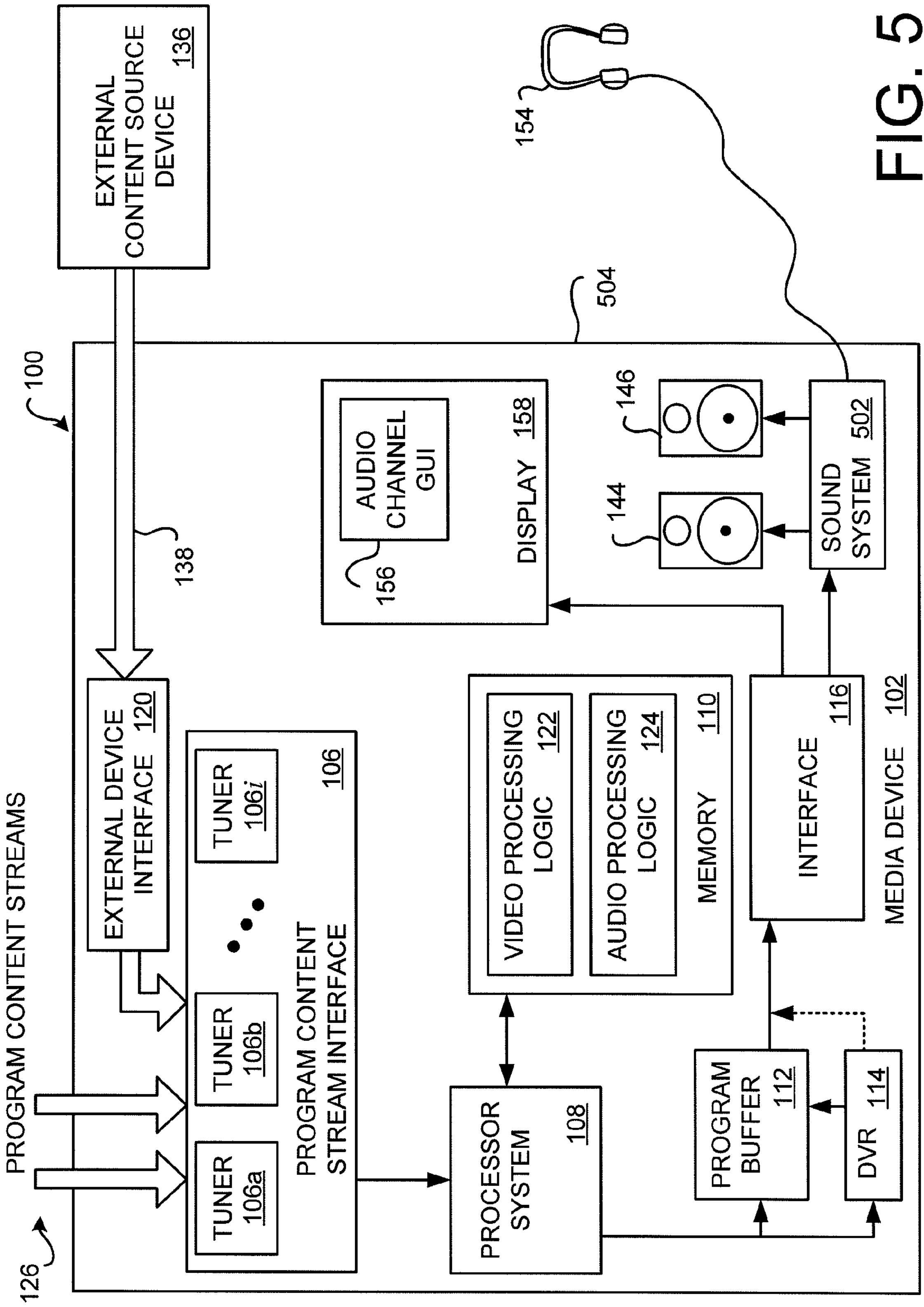
FIG. 5 illustrates an alternative embodiment of a media device.

FIG. 5 illustrates an alternative embodiment of a media device 102. Here, the display 158, a sound system 502, and the speakers 144, 146, are integrated with the program content stream interface 106, the processor system 108, the memory 110, the program buffer 112, the optional digital video recorder (DVR) 114, the interface 116, and the optional external device interface 120 in a housing 504.

In the above described exemplary embodiments of the audio channel control GUIs 302, 402, the virtual volume level controllers were described as virtual slidably adjustable virtual fader bars oriented in a horizontal position. Any other virtual volume level controller may be used in alternative embodiments. For example, the virtual slidably adjustable virtual fader bars may be oriented in a vertical position. In another embodiment, a virtual rotatable volume control knob may be used wherein a dial position of the virtual control knob defines volume. A location may be available wherein a user may specify numerical values, or letters, which define the volume. A plurality of virtual selectable buttons may be provided so that the user may select predefined values of volume.

In some embodiments, the virtual volume level controllers may be configured to control the volume level for multiple speakers. For example, a first virtual volume level controller could control the front left channel speaker 144 and the rear left channel speaker 148, while a second virtual volume level controller could control the front right channel speaker 146 and the rear right channel speaker 150.

In some embodiments, more than two audio channels may be combined and the associated volume levels controlled by suitable virtual volume level controllers. For example, three received audio/visual program streams may be processed so that selected audio channels are combined.

Any suitable process, technology, system, and/or means for combining audio channels may be used by the various embodiments. Further, signal formats may be the same or may be processed into a suitable format. For example, two digital format audio channels may be combined into an digital format combined audio channel. Two digital audio channels may be combined. An analog format audio channel may be processed into a digital format audio channel and then combined with another digital format audio channel (or vice versa).

It should be emphasized that the above-described embodiments of the media device audio control system 100 are merely possible examples of implementations of the invention. Many variations and modifications may be made to the above-described embodiments. All such modifications and variations are intended to be included herein within the scope of this disclosure and protected by the following claims.

The embodiments of the invention in which an exclusive property or privilege is claimed are defined as follows:

1. A method for controlling volume of audio channels of a combined audio channel, the method comprising:

receiving a first program stream with a first audio channel and a first video channel associated with a first program of interest;

receiving a second program stream with a second audio channel and a second video channel associated with a second program of interest, wherein the second program of interest is different from the first program of interest;

communicating the first video channel and the second video channel to a display, wherein the first video channel is presented on a first field area of the display, and wherein the second video channel on a second field area of the display, wherein the first video channel and the second video channel are concurrently displayed on the display;

combining the first audio channel and the second audio channel into the combined audio channel, wherein at least one speaker presents as sound the combined audio channel corresponding to both of the first audio channel and the second audio channel, wherein the first audio channel is presented at a first volume level, and wherein the second audio channel is presented at a second volume level;

adjusting at least one of the first volume level of the first audio channel and the second volume level of the second audio channel, the adjusting comprising:

displaying an audio channel control graphical user interface (GUI) on the display as a virtual fader bar, wherein the virtual fader bar concurrently indicates a first value associated with the first volume level for the first audio channel and the second value associated with a second volume level for the second audio channel, wherein the first value and the second value are indicated relative to each other, and wherein the first value and the second value together equals a value of the combined audio channel;

displaying on the audio channel control GUI the first value associated with the first volume level of the first audio channel of the combined audio channel;

displaying on the audio channel control GUI the second value associated with the second volume level of the second audio channel of the combined audio channel; and receiving commands from a remote control that causes adjustment of the first value to an adjusted first value of the combined audio channel by presenting a change to the virtual fader bar, wherein the change to the virtual fader bar concurrently changes the first value associated with the first volume level for the first audio channel and the second value associated with the second volume level for the second audio channel; and adjusting volume of the combined audio channel in accordance with the change to the virtual fader bar, wherein the adjustment of the first value of the combined audio channel is graphically depicted on the virtual fader bar of the audio channel control GUI; and wherein the at least one speaker presents as sound at the adjusted first volume level and the second volume level.

2. The method of claim 1, further comprising:

presenting the first video channel on a main field area of a display; and presenting the second video channel as a picture in picture (PIP) area of the display, wherein the first video channel and the second video channel are concurrently presented on the display.

3. The method of claim 1, wherein the first program stream and the second program stream are received by a media device, wherein the display is a component of a media presentation device, and further comprising:

communicating the audio channel control GUI from the media device to the media presentation device.

4. The method of claim 1, wherein the first program stream and the second program stream are received by a media device, wherein the display is a component of a media presentation device, and further comprising:

communicating the combined audio channel, the first video channel, and the second video channel from the media device to the media presentation device.

5. The method of claim 1, wherein the first program stream includes a third audio channel and the second program stream includes a fourth audio channel, wherein the combined audio channel is a first combined audio channel and the speaker is a first speaker, and further comprising:

combining the third audio channel and the fourth audio channel into a second combined audio channel, wherein at least one second speaker presents as sound the second combined audio channel corresponding to both of the third audio channel and the fourth audio channel, wherein the third audio channel is presented at a third volume level, and wherein the fourth audio channel is presented at a fourth volume level;

displaying a third value associated with a third volume level of the third audio channel on the audio channel control GUI;

displaying a fourth value associated with a fourth volume level of the fourth audio channel on the audio channel control GUI; and receiving commands from the remote control that causes adjustment of the third value to an adjusted third value, wherein the adjustment of the third value is graphically depicted on the audio channel control GUI, and wherein the at least one second speaker presents as sound at the adjusted third volume level and the adjusted fourth volume level.

6. The method of claim 5, communicating the second combined audio channel to a second speaker, wherein the volume level of produced sound from the second speaker corresponds to the adjusted value associated with the third volume level for the third audio channel and the adjusted value associated with the fourth volume level for the fourth audio channel.

7. The method of claim 5, wherein the first program stream corresponds to a movie having the first video channel and at least the first audio channel and the third audio channel, and wherein the second program stream is a music track having only the second audio channel and the fourth audio channel.

8. The method of claim 1, wherein the first program stream includes a third audio channel and the second program stream includes a fourth audio channel, wherein the combined audio channel is a first combined audio channel and the speaker is a first speaker, and further comprising:

communicating only the third audio channel to a second speaker.

9. The method of claim 1, further comprising:

graphically indicating a first change to the first value associated with the first volume level for the first audio channel on the displayed audio channel control GUI;

graphically indicating a second change to the second value associated with the second volume level for the second audio channel on the displayed audio channel control GUI; and graphically indicating an adjusted volume of the combined audio channel in accordance with the first changed first value and the second changed second value.

10. The method of claim 1, wherein displaying the first value and the second value on the audio channel control GUI displayed on the display comprises:

displaying a first virtual fader bar on the audio channel control GUI, wherein the first virtual fader bar indicates the first value associated with the first volume level for the first audio channel; and displaying a second virtual fader bar on the audio channel control GUI, wherein the second virtual fader bar indicates the second value associated with the second volume level for the second audio channel.

11. The method of claim 10, further comprising:

receiving a first change to the first virtual fader bar, wherein the first change to the first virtual fader bar changes the first value associated with the first volume level for the first audio channel;

receiving a second change to the second virtual fader bar, wherein the second change to the second virtual fader bar changes the second value associated with the second volume level for the second audio channel; and adjusting volume of the combined audio channel in accordance with the first change to the first virtual fader bar and the second change to the second virtual fader bar.

12. A system to control volume levels of audio channels of a combined audio channel, comprising:

a display operable to display a virtual fader bar on an audio channel control graphical user interface (GUI), wherein the virtual fader bar on the audio channel control GUI displays a first value associated with a first volume level for a first audio channel of the combined audio channel and displays a second value associated with a second volume level for a second audio channel of the combined audio channel, displaying a virtual fader bar on the audio channel control GUI, wherein the first virtual fader bar concurrently indicates the first value associated with the first volume level for the first audio channel and the second value associated with the second volume level for the second audio channel, wherein the first value and the second value are indicated relative to each other, wherein the first value and the second value together equals a value of the combined audio channel, and wherein the first audio channel is associated with a first program of interest, and wherein the second audio channel is associated with a second program of interest that is different from the first program of interest;

a remote interface operable to receive commands from a remote control, wherein the remote control commands allow navigation about the displayed audio channel control GUI to adjust volume of the combined audio channel in accordance with a change to the displayed virtual fader bar;

a processor system operable to cause an adjustment to the first value associated with the first volume level for the first audio channel in response to receiving a change to the virtual fader bar, wherein the adjustment corresponds to the received remote control commands, and wherein the change to the virtual fader bar concurrently changes the first value associated with the first volume level for the first audio channel and the second value associated with the second volume level for the second audio channel; and an interface to a sound system, wherein the interface is operable to communicate the combined audio channel to the sound system.

13. The system of claim 12, wherein the display, the remote interface, the processor, the interface and the sound system reside in a housing.

14. The system of claim 12, wherein the remote interface, the processor and the interface reside in a media device, wherein the display resides in a media presentation device communicatively coupled to the media device, and wherein the remote is operable to control the media device and the presentation device.

* * * * *